(12) United States Patent
Hsu et al.

(10) Patent No.: US 9,386,613 B2
(45) Date of Patent: Jul. 5, 2016

(54) WIRELESS NETWORK SYSTEM AND CONNECTING METHOD THEREOF

(71) Applicant: REALTEK SEMICONDUCTOR CORPORATION, Hsinchu (TW)

(72) Inventors: Chin-Yu Hsu, Yilan County (TW); Kuang-Yu Yen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 286 days.

(21) Appl. No.: 14/158,243

(22) Filed: Jan. 17, 2014

(65) Prior Publication Data

US 2014/0286323 A1 Sep. 25, 2014

(30) Foreign Application Priority Data

Mar. 20, 2013 (AD) .............................. 102109774 A

(51) Int. Cl.
*H04W 76/02* (2009.01)
*H04W 12/06* (2009.01)
*H04W 12/12* (2009.01)
*H04W 84/12* (2009.01)

(52) U.S. Cl.
CPC ............ *H04W 76/021* (2013.01); *H04W 12/06* (2013.01); *H04W 12/12* (2013.01); *H04W 84/12* (2013.01)

(58) Field of Classification Search
CPC ................... H04W 76/021; H04W 8/00–8/12; H04W 84/12; H04W 12/06; H04W 48/08; H04W 48/12; H04W 12/04; H04W 48/18; H04W 48/20; H04W 2463/081
See application file for complete search history.

(56) References Cited

U.S. PATENT DOCUMENTS

| 7,127,258 | B2 * | 10/2006 | Zegelin ................. H04W 48/20 370/328 |
| 8,166,309 | B2 * | 4/2012 | Muralidharan ....... H04L 63/065 713/181 |
| 2006/0117174 | A1 * | 6/2006 | Lee ..................... H04L 41/0886 713/154 |
| 2008/0137553 | A1 | 6/2008 | Hsu et al. |

(Continued)

FOREIGN PATENT DOCUMENTS

TW 200644496 12/2006

*Primary Examiner* — Curtis A Alia
(74) *Attorney, Agent, or Firm* — Tim Tingkang Xia, Esq.; Locke Lord LLP

(57) ABSTRACT

A wireless network system and a connecting method thereof are provided. The wireless network system includes a Wi-Fi apparatus and a communication apparatus. The Wi-Fi apparatus provides a Service Set Identifier (SSID). The SSID includes a first identifier value and a second identifier value, and the second identifier value is derived from the first identifier value by a hash function. After searching the SSID of the Wi-Fi apparatus, the communication apparatus determines that a value derived from the first identifier value of the SSID by the hash function is equal to the second identifier value, and then establishes a Wi-Fi authenticating connection with the Wi-Fi apparatus according to a connection password. The Wi-Fi apparatus establishes a data transmission connection with the communication apparatus after determining that the communication apparatus is legal according to the Wi-Fi authenticating connection.

12 Claims, 4 Drawing Sheets

(56) References Cited

U.S. PATENT DOCUMENTS

| | | | | |
|---|---|---|---|---|
| 2010/0008259 A1* | 1/2010 | Yoon | ................... | H04W 36/08 370/254 |
| 2012/0282924 A1* | 11/2012 | Tagg | ................... | H04W 8/04 455/432.1 |
| 2013/0021949 A1 | 1/2013 | Kaal | | |
| 2013/0039352 A1* | 2/2013 | Ruster | ................... | H04W 88/08 370/338 |
| 2014/0181916 A1* | 6/2014 | Koo | ................... | H04W 12/08 726/4 |
| 2014/0189808 A1* | 7/2014 | Mahaffey | ................... | H04L 63/0853 726/4 |
| 2014/0192809 A1* | 7/2014 | Park | ................... | H04W 48/16 370/392 |

* cited by examiner

WIRELESS NETWORK SYSTEM AND CONNECTING METHOD THEREOF

This application claims priority to Taiwan Patent Application No. 102109774 filed on Mar. 20, 2013, which is hereby incorporated by reference in its entirety.

CROSS-REFERENCES TO RELATED APPLICATIONS

Not applicable.

BACKGROUND OF THE INVENTION

1. Field of the Invention

The present invention relates to a wireless network system and a connecting method thereof. More particularly, the present invention relates to a wireless network system and a connecting method thereof that establish a connection automatically according to a service set identifier (SSID).

2. Descriptions of the Related Art

The Wi-Fi protocol is a kind of network protocol that is widely used in wireless networks at present. Correspondingly, more and more related products have been developed. Specifically, apart from being used in computers and mobile phones, the Wi-Fi network protocol may also be used in electronic appliances of daily use (e.g., Wi-Fi access points, or Wi-Fi communication enabled refrigerators, electric lamps or sockets) as the embedded system technologies become well developed and widely used. Thus, users can remotely control the Wi-Fi communication enabled electronic appliances of daily use through the Wi-Fi network protocol.

However, because the embedded systems used in the electronic appliances are usually simple, the operation interfaces thereof are not so user-friendly as those of computers or mobile phones. Additionally, setting a Wi-Fi data transmission connection usually represents a complex process. Therefore, for the Wi-Fi communication enabled electronic appliances, it is generally difficult for general users to perform a setting procedure through use of the simple embedded systems.

Furthermore, some Wi-Fi communication enabled electronic appliances that allow for a relatively simple Wi-Fi setting procedure have become available in the market. However, it is only the Wi-Fi setting procedure that is simplified, and the user must still manually establish a Wi-Fi connection with such a Wi-Fi communication enabled electronic appliance before he or she can perform the setting on the electronic appliance. Because of the difficulty in performing the Wi-Fi related setting on the Wi-Fi communication enabled electronic appliances, the Wi-Fi communication enabled electronic appliances can still not be widely accepted by the general users.

Accordingly, an urgent need still exists in the art to effectively reduce the complexity in setting the Wi-Fi connection so as to increase the users' desires to use the Wi-Fi communication enabled electronic appliances.

SUMMARY OF THE INVENTION

To solve the aforesaid problem, the present invention provides a wireless network system and a connecting method thereof that, mainly through particular configuration of the service set identifier (SSID), can automatically establish a connection between a communication apparatus and a Wi-Fi apparatus so that subsequent setting on the Wi-Fi apparatus can be performed.

To achieve the aforesaid objective, the present invention further discloses a connecting method for use in a wireless network system. The wireless network system comprises a Wi-Fi apparatus and a communication apparatus. The Wi-Fi apparatus possesses a connection password. The connecting method comprises the following steps of: (a) enabling the Wi-Fi apparatus to provide a Service Set Identifier (SSID), wherein the SSID comprises a first identifier value and a second identifier value, and the second identifier value is derived from the first identifier value by a hash function; (b) enabling the communication apparatus to search the SSID of the Wi-Fi apparatus; (c) enabling the communication apparatus to determine that a value derived from the first identifier value of the SSID by the hash function is equal to the second identifier value; (d) enabling the communication apparatus to generate the connection password and establish a Wi-Fi authenticating connection with the Wi-Fi apparatus according to the connection password; (e) enabling the Wi-Fi apparatus to determine that the communication apparatus is legal according to the Wi-Fi authenticating connection; and (f) enabling the communication apparatus to establish a data transmission connection with the Wi-Fi apparatus.

To achieve the aforesaid objective, the present invention further discloses a wireless network system. The wireless network system comprises a Wi-Fi apparatus and a communication apparatus. The Wi-Fi apparatus has a connection password and is configured to provide a Service Set Identifier (SSID). The SSID comprises a first identifier value and a second identifier value, and the second identifier value is derived from the first identifier value by a hash function. The communication apparatus is configured to search the SSID of the Wi-Fi apparatus and determine that a value derived from the first identifier value of the SSID by the hash function is equal to the second identifier value. The communication apparatus is further configured to establish a Wi-Fi authenticating connection with the Wi-Fi apparatus according to the connection password after generating the connection password. The Wi-Fi apparatus is further configured to establish a data transmission connection with the communication apparatus after determining that the communication apparatus is legal according to the Wi-Fi authenticating connection.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration but not to limit the present invention. In the following embodiments and attached drawings, elements unrelated to the present invention are omitted from depiction; and dimensional relationships among the individual elements in the attached drawings are illustrated only for ease of understanding, but not to limit the actual scale.

Figure 1A:
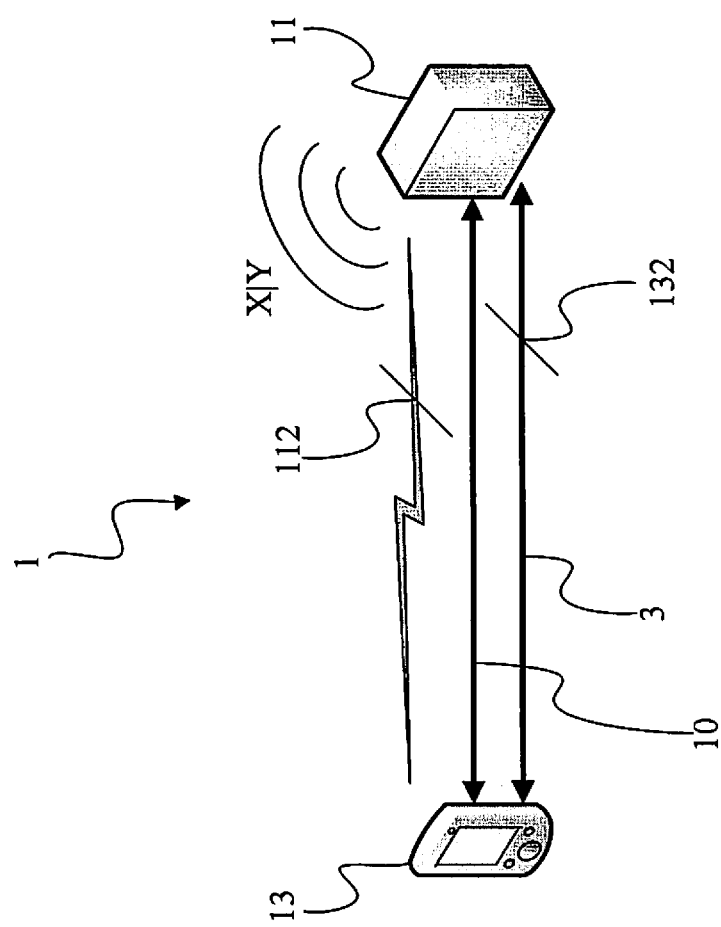
FIG. 1A is a schematic view of a wireless network system according to a first embodiment of the present invention.
Figure 1B:
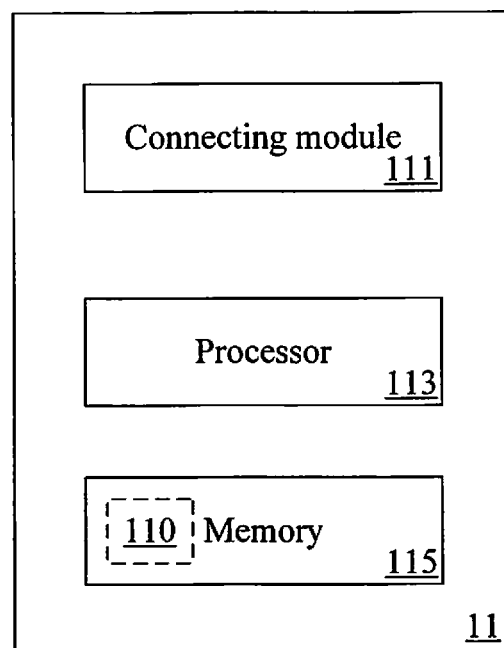
FIG. 1B is a schematic view of a Wi-Fi apparatus according to the first embodiment of the present invention.
Figure 1C:
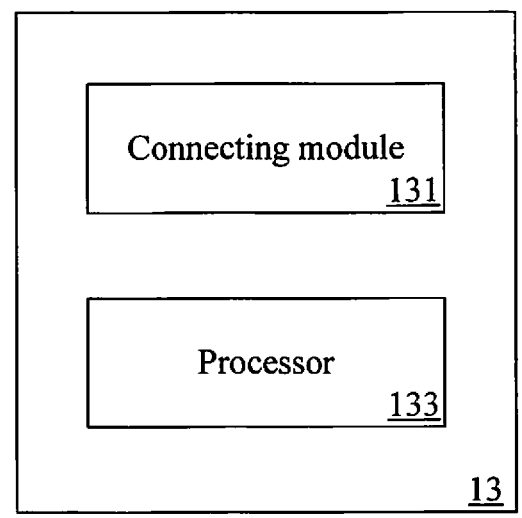
FIG. 1C is a schematic view of a communication apparatus according to the first embodiment of the present invention.

Please refer to FIGS. 1A-1C. FIG. 1A is a schematic view of a wireless network system 1 according to a first embodiment of the present invention. The wireless network system 1 comprises a Wi-Fi apparatus 11 and a communication apparatus 13. FIG. 1B is a schematic view of the Wi-Fi apparatus 11 according to the first embodiment of the present invention. The Wi-Fi apparatus 11 comprises a connecting module 111, a processor 113 and a memory 115. The memory 115 possesses a connection password 110. FIG. 1C is a schematic view of the communication apparatus 13 according to the first embodiment of the present invention. The communication apparatus 13 comprises a connecting module 131 and a processor 133.

It should be appreciated first that, in the first embodiment, the Wi-Fi apparatus 11 may be a wireless network access point or be a Wi-Fi communication enabled apparatus with a simple embedded system, and the communication apparatus 13 may be a mobile phone, a computer or a personal digital assistant (PDA). However, this is not intended to limit implementations of the Wi-Fi apparatus and the communication apparatus of the present invention, and other hardware implementations of the Wi-Fi apparatus and the communication apparatus can be readily devised by those skilled in the art upon reviewing the disclosures of the present invention.

Firstly, the connecting module 111 of the Wi-Fi apparatus 11 provides a service set identifier (SSID) X|Y. The SSID X|Y is a factory setting of the Wi-Fi apparatus 11 and mainly comprises a first identifier value X and a second identifier value Y. The second identifier value Y is a value derived from the first identifier value X by a hash function (not shown).

Subsequently, when the connecting module 131 of the communication apparatus 13 has found the SSID X|Y provided by the Wi-Fi apparatus 11, the processor 133 of the communication apparatus 13 inputs the first identifier value X of the SSID X|Y to the same hash function and determines whether the resulting value is equal to the second identifier value Y of the SSID X|Y. If the value derived from the first identifier value X by the same hash function is equal to the second identifier value Y, then the SSID X|Y is a qualified identifier; or otherwise, the SSID X|Y is an unqualified identifier.

For example, assume that the SSID of the Wi-Fi apparatus has a length of 12 bytes, which can be divided into a first group of 8 bytes (i.e., the first identifier value) and a second group of 4 bytes (i.e., the second identifier value). The value of the second group of 4 bytes is derived from the value of the first group of 8 bytes by the hash function. Accordingly, the communication apparatus that is searching the SSID may firstly input the value of the first group of 8 bytes of the SSID into the hash function and determine whether the resulting value is equal to the value of the second group of 4 bytes of the SSID so as to determine whether the Wi-Fi apparatus with this SSID is qualified.

Then, after the communication apparatus 13 determines that the SSID X|Y is qualified, the processor 133 of the communication apparatus 13 generates the connection password 110, and the connecting module 131 of the communication apparatus 13 can establish a Wi-Fi authenticating connection 10 with the Wi-Fi apparatus 11 according to the connection password 110. In other words, the connecting module 111 of the Wi-Fi apparatus 11 also establishes the Wi-Fi authenticating connection 10 with the communication apparatus 13 according to the connection password 110.

Subsequently, since the Wi-Fi apparatus 11 and the communication apparatus 13 establish the Wi-Fi authenticating connection 10 by use of the same connection password 110, both the Wi-Fi apparatus 11 and the communication apparatus 13 can pass the Wi-Fi connection authentication. In other words, the processor 113 of the Wi-Fi apparatus 11 can determine the legality of the communication apparatus 13 according to the Wi-Fi authenticating connection 10. Thus, after determining that the communication apparatus 13 is legal, the processor 113 of the Wi-Fi apparatus 11 can establish a data transmission connection 3 with the connecting module 131 of the communication apparatus 13 via the connecting module 111 so that subsequent data transmission or configuration setting can be performed.

It should be appreciated that, there may be a plurality of Wi-Fi apparatuses to be set within communication coverage of the communication apparatus. Preferably, after receiving a plurality of connection signals from the plurality of Wi-Fi apparatuses, the communication apparatus can firstly determine which Wi-Fi apparatus has the strongest connection signal and determine that the strongest connection signal has a main signal strength for use as a basis of the connection.

In the first embodiment, the connecting module 131 of the communication apparatus 13 receives a connection signal 112 from the Wi-Fi apparatus 11 after the processor 133 determines that the SSID X|Y is correct. Meanwhile, the processor 133 of the communication apparatus 13 determines that the connection signal 112 has a main signal strength (i.e., the Wi-Fi apparatus 11 has a signal strength higher than those of other possible Wi-Fi apparatuses). Accordingly, the connecting module 131 of the communication apparatus 13 communicates with the Wi-Fi apparatus 11 so that the subsequent Wi-Fi connection authenticating process is performed.

Additionally in the first embodiment, the connection password may also be generated in a more complex way to make the Wi-Fi authenticating mechanism more stringent. In particular, the connection password 110 stored in the memory 115 of the Wi-Fi apparatus 11 is generated according to the SSID X|Y and the media access control address of the Wi-Fi apparatus 11. Accordingly, when the communication apparatus 13 desires to establish an authenticating connection with the Wi-Fi apparatus 11, the processor 133 of the communication apparatus 13 can generate the connection password 110 directly according to the already-known SSID X|Y and the media access control address of the Wi-Fi apparatus 11 that is retrieved via a network packet, so that the Wi-Fi authenticating connection 10 is established subsequently.

It should be emphasized additionally that, in the present invention, the Wi-Fi apparatus and the communication apparatus may transform the SSID and the media access control address of the Wi-Fi apparatus into the connection password through the use of any associated mathematical function (e.g., a one-way hash function), and the present invention is not limited to.

Furthermore, after the data transmission connection 3 is established, the Wi-Fi apparatus 11 and the communication apparatus 13 can exchange information therebetween to perform the configuration setting. In particular, when a user desires to change the configuration setting (e.g., the SSID or an original password) of the Wi-Fi apparatus 11, the user can transmit a configuration setting message 132 from the connecting module 131 of the communication apparatus 13 to the Wi-Fi apparatus 11 via the data transmission connection 3. After the configuration setting message 132 is received by the connecting module 111, the processor 113 of the Wi-Fi apparatus 11 can adjust the configuration setting of the Wi-Fi apparatus 11 according to the configuration setting message 132.

Figure 2:
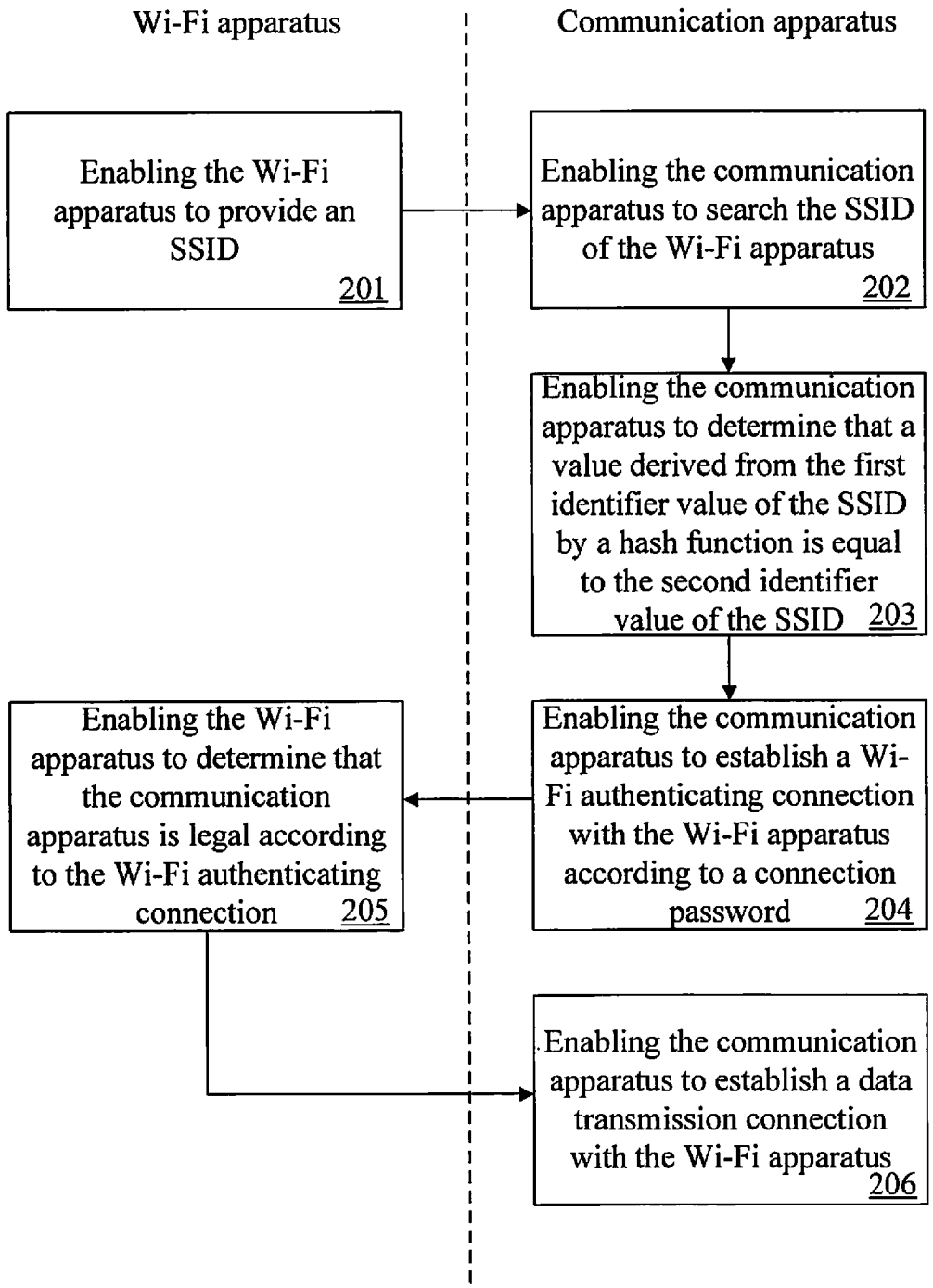
FIG. 2 is a flowchart diagram of a connecting method according to a second embodiment of the present invention.

A second embodiment of the present invention is a connecting method, a flowchart diagram of which is shown in FIG. 2. The method of the second embodiment is for use in a wireless network system (e.g., the wireless network system 1 of the aforesaid embodiment), which comprises a Wi-Fi apparatus and a communication apparatus. The Wi-Fi apparatus possesses a connection password. Steps of the second embodiment will be detailed as follows.

Firstly, step 201 is executed to enable the Wi-Fi apparatus to provide an SSID. The SSID comprises a first identifier value and a second identifier value, and the second identifier value is derived from the first identifier value by a hash function. Subsequently, step 202 is executed to enable the communication apparatus to search the SSID of the Wi-Fi apparatus. Then, step 203 is executed to enable the communication apparatus to determine that a value derived from the first identifier value of the SSID by the hash function is equal to the second identifier value of the SSID.

Subsequently, step 204 is executed to enable the communication apparatus to generate the connection password after the step 203 and establish a Wi-Fi authenticating connection with the Wi-Fi apparatus according to the connection password. Next, step 205 is executed to enable the Wi-Fi apparatus to determine that the communication apparatus is legal according to the Wi-Fi authenticating connection. Finally, step 206 is executed to enable the communication apparatus to establish a data transmission connection with the Wi-Fi apparatus after the step 205. In other words, the Wi-Fi apparatus establishes the data transmission connection with the communication apparatus after determining that the communication apparatus is legal.

Figure 3:
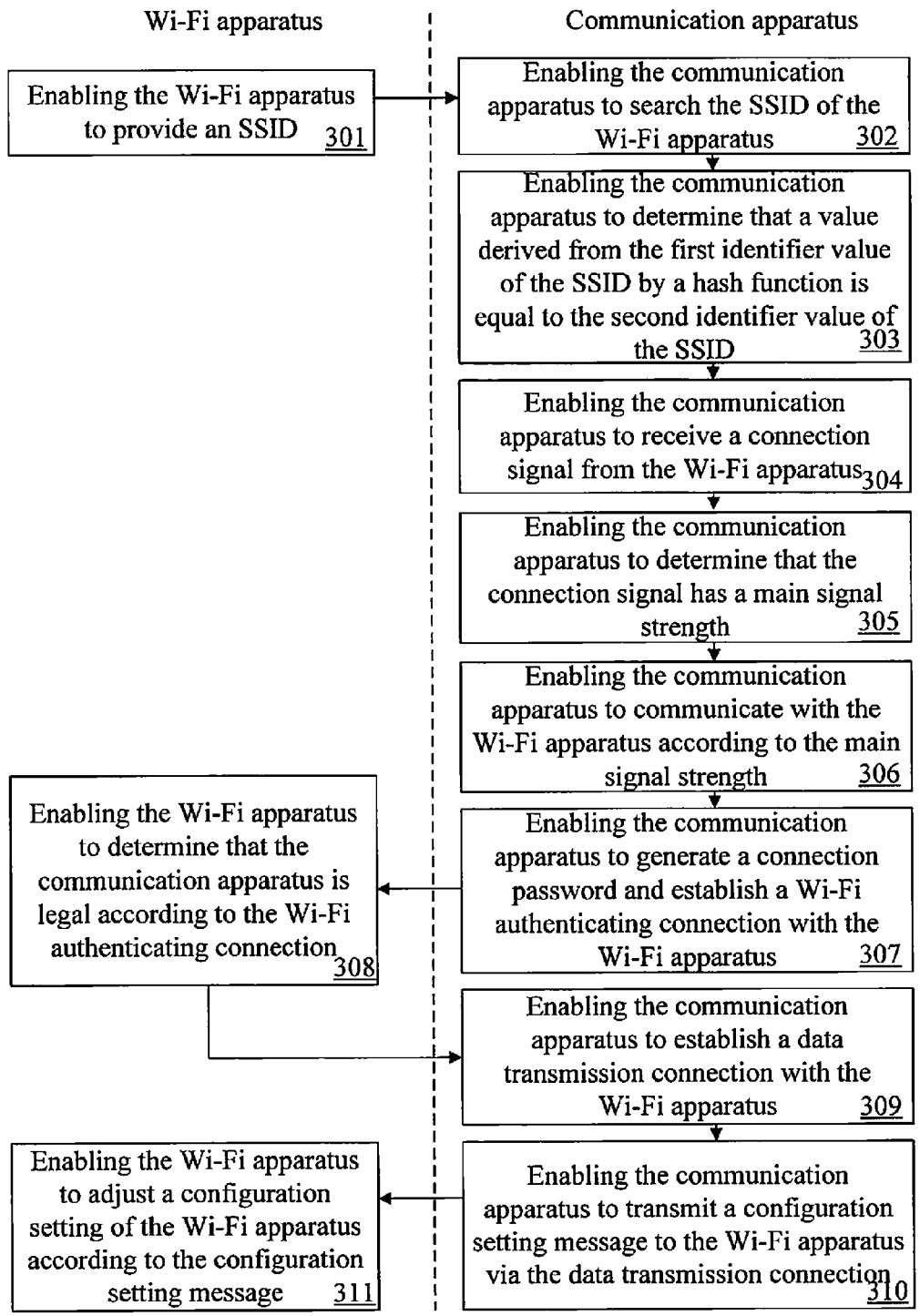
FIG. 3 is a flowchart diagram of a connecting method according to a third embodiment of the present invention.

A third embodiment of the present invention is a connecting method, a flowchart diagram of which is shown in FIG. 3. The method of the third embodiment is for use in a wireless network system (e.g., the wireless network system 1 of the aforesaid embodiment), which comprises a Wi-Fi apparatus and a communication apparatus. The Wi-Fi apparatus possesses a connection password. Steps of the third embodiment will be detailed as follows.

Firstly, step 301 is executed to enable the Wi-Fi apparatus to provide an SSID. The SSID comprises a first identifier value and a second identifier value, and the second identifier value is derived from the first identifier value by a hash function. Subsequently, step 302 is executed to enable the communication apparatus to search the SSID of the Wi-Fi apparatus. Then, step 303 is executed to enable the communication apparatus to determine that a value derived from the first identifier value of the SSID by the hash function is equal to the second identifier value of the SSID.

Subsequently, step 304 is executed to enable the communication apparatus to receive a connection signal from the Wi-Fi apparatus after the step 303. Then, step 305 is executed to enable the communication apparatus to determine that the connection signal has a main signal strength. Next, step 306 is executed to enable the communication apparatus to communicate with the Wi-Fi apparatus according to the main signal strength. Then, step 307 is executed to enable the communication apparatus to generate the connection password according to the SSID and a media access control address of the Wi-Fi apparatus and establish the Wi-Fi authenticating connection with the Wi-Fi apparatus according to the connection password after the step 306.

Step 308 is executed to enable the Wi-Fi apparatus to determine that the communication apparatus is legal according to the Wi-Fi authenticating connection. Then, step 309 is executed to enable the communication apparatus to automatically establish a data transmission connection with the Wi-Fi apparatus after the step 308. Next, step 310 is executed to enable the communication apparatus to transmit a configuration setting message to the Wi-Fi apparatus via the data transmission connection. Finally, step 311 is executed to enable the Wi-Fi apparatus to adjust a configuration setting of the Wi-Fi apparatus according to the configuration setting message.

According to the above descriptions, the present invention provides a wireless network system and a connecting method thereof. The wireless network system comprises a Wi-Fi apparatus and a communication apparatus. An SSID provided by the Wi-Fi apparatus comprises a first identifier value and a second identifier value, and the second identifier value is derived from the first identifier value by a hash function. The communication apparatus (e.g., a computer, a mobile phone or the like) can determine the Wi-Fi apparatus to be set and the connection password thereof according to the first identifier value and the second identifier value of the SSID, and can establish a connection with the Wi-Fi apparatus automatically through an application.

In other words, according to the present invention, the communication apparatus can determine the Wi-Fi apparatus to be set according to the SSID that is automatically provided by the Wi-Fi apparatus, and obtain the connection password of the Wi-Fi apparatus according to the SSID so that the communication apparatus and the Wi-Fi apparatus can establish a connection with each other automatically.

Accordingly, as compared with traditional Wi-Fi apparatuses, the wireless network system and the connecting method thereof according to the present invention allow the communication apparatus to automatically establish a connection with the Wi-Fi apparatus when the Wi-Fi apparatus is activated in an as-delivered state, so it is unnecessary for a user to manually set the Wi-Fi connection firstly. Thereby, the problem that the user must manually set the Wi-Fi connection firstly in order to set the Wi-Fi apparatus is effectively solved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A connecting method for use in a wireless network system, the wireless network system comprising a Wi-Fi apparatus and a communication apparatus, and the Wi-Fi apparatus possessing a connection password, the connecting method comprising the following steps of:
   (a) enabling the Wi-Fi apparatus to provide a Service Set Identifier (SSID), wherein the SSID comprises a first identifier value and a second identifier value, and the second identifier value is derived from the first identifier value by a hash function;
   (b) enabling the communication apparatus to search the SSID of the Wi-Fi apparatus;

(c) enabling the communication apparatus to determine that a value derived from the first identifier value of the SSID by the hash function is equal to the second identifier value;

(d) enabling the communication apparatus to generate the connection password and establish a Wi-Fi authenticating connection with the Wi-Fi apparatus according to the connection password;

(e) enabling the Wi-Fi apparatus to determine that the communication apparatus is legal according to the Wi-Fi authenticating connection; and (f) enabling the communication apparatus to establish a data transmission connection with the Wi-Fi apparatus.

2. The connecting method as claimed in claim 1, further comprising the following steps after step (f):

(g) enabling the communication apparatus to transmit a configuration setting message to the Wi-Fi apparatus via the data transmission connection; and (h) enabling the Wi-Fi apparatus to adjust a configuration setting of the Wi-Fi apparatus according to the configuration setting message.

3. The connecting method as claimed in claim 1, wherein step (d) further comprises the following step of:

(d1) enabling the communication apparatus to generate the connection password according to the SSID and a Media Access Control Address of the Wi-Fi apparatus.

4. The connecting method as claimed in claim 1, wherein step (d) further comprises the following steps of:

(d1) enabling the communication apparatus to receive a connection signal from the Wi-Fi apparatus;

(d2) enabling the communication apparatus to determine that the connection signal has a main signal strength;

(d3) enabling the communication apparatus to communicate with the Wi-Fi apparatus according to the main signal strength; and (d4) enabling the communication apparatus to generate the connection password and establish the Wi-Fi authenticating connection with the Wi-Fi apparatus according to the connection password.

5. The connecting method as claimed in claim 1, wherein each of the first identifier value and the second identifier value is respectively independent and different from the connection password.

6. The connecting method as claimed in claim 1, wherein the first identifier value and the second identifier value are different in length.

7. A wireless network system, comprising:

a Wi-Fi apparatus, having a connection password and being configured to provide a Service Set Identifier (SSID), wherein the SSID comprises a first identifier value and a second identifier value, and the second identifier value is derived from the first identifier value by a hash function; and a communication apparatus, being configured to search the SSID of the Wi-Fi apparatus and determine that a value derived from the first identifier value of the SSID by the hash function is equal to the second identifier value; and wherein the communication apparatus is further configured to establish a Wi-Fi authenticating connection with the Wi-Fi apparatus according to a connection password after generating the connection password, and the Wi-Fi apparatus is further configured to establish a data transmission connection with the communication apparatus after determining that the communication apparatus is legal according to the Wi-Fi authenticating connection.

8. The wireless network system as claimed in claim 7, wherein the communication apparatus is further configured to transmit a configuration setting message to the Wi-Fi apparatus via the data transmission connection, and the Wi-Fi apparatus is further configured to adjust a configuration setting of the Wi-Fi apparatus according to the configuration setting message.

9. The wireless network system as claimed in claim 7, wherein the communication apparatus is further configured to generate the connection password according to the SSID and a Media Access Control Address of the Wi-Fi apparatus.

10. The wireless network system as claimed in claim 7, wherein the communication apparatus is further configured to receive a connection signal from the Wi-Fi apparatus and determine that the connection signal has a main signal strength, the communication apparatus is further configured to communicate with the Wi-Fi apparatus according to the main signal strength, and the communication apparatus is further configured to establish the Wi-Fi authenticating connection with the Wi-Fi apparatus according to the connection password after generating the connection password.

11. The wireless network system as claimed in claim 7, wherein each of the first identifier value and the second identifier value is respectively independent and different from the connection password.

12. The wireless network system as claimed in claim 7, wherein the first identifier value and the second identifier value are different in length.

* * * * *